US006963852B2

(12) United States Patent
Koresko, V

(10) Patent No.: US 6,963,852 B2
(45) Date of Patent: Nov. 8, 2005

(54) SYSTEM AND METHOD FOR CREATING A DEFINED BENEFIT PENSION PLAN FUNDED WITH A VARIABLE LIFE INSURANCE POLICY AND/OR A VARIABLE ANNUITY POLICY

(76) Inventor: John J. Koresko, V, 1159 Seaton Ross Rd., Radnor, PA (US) 19087

( * ) Notice: Subject to any disclaimer, the term of this patent is extended or adjusted under 35 U.S.C. 154(b) by 266 days.

(21) Appl. No.: 10/086,924

(22) Filed: Feb. 28, 2002

(65) Prior Publication Data

US 2002/0198802 A1 Dec. 26, 2002

Related U.S. Application Data

(60) Provisional application No. 60/296,173, filed on Jun. 6, 2001.

(51) Int. Cl.$^7$ .............................................. G06F 17/60
(52) U.S. Cl. ............................................. 705/35; 705/4
(58) Field of Search .......................... 705/35, 36, 37, 705/42, 34, 4, 38, 1, 39

(56) References Cited

U.S. PATENT DOCUMENTS

| | | | |
|---|---|---|---|
| 5,136,502 | A | 8/1992 | Van Remortel et al. |
| 5,742,775 | A | 4/1998 | King |
| 5,752,236 | A | 5/1998 | Sexton et al. |
| 5,775,734 | A | 7/1998 | George, Jr. |
| 5,913,198 | A | 6/1999 | Banks |
| 5,926,800 | A | 7/1999 | Baronowski et al. |
| 5,933,815 | A | 8/1999 | Golden |
| 5,966,693 | A * | 10/1999 | Burgess .......................... 705/4 |
| 5,991,744 | A | 11/1999 | DiCresce |
| 5,999,917 | A | 12/1999 | Facciani et al. |
| 6,049,772 | A | 4/2000 | Payne et al. |
| 6,148,293 | A | 11/2000 | King |
| 6,161,096 | A | 12/2000 | Bell |
| 6,304,859 | B1 * | 10/2001 | Ryan et al. ..................... 705/38 |
| 6,411,939 | B1 * | 6/2002 | Parsons ....................... 705/35 |
| 6,636,834 | B1 * | 10/2003 | Schirripa ....................... 705/4 |

OTHER PUBLICATIONS

Associates in Adolescent Psychiatry v. Home Life, 941 F.2d 561 (7th Cir. 1991), from Westlaw Reporter, 11 pages.
PCT International Search Report for PCT/US02/18228, mailed Sep. 5, 2003, 6 pages.
"The Berkshire Pension System Qualified Retirement Plans for Small Businesses", printout from website, http://www.theberkshire.com/insurance/business_retirement.html., printout date: Jun. 2001, original web page publication date: unknown, 5 pages.
"§412(i) Defined Benefit Fully Insured Pension Plans–An Alternative to Traditional Pension Plan Funding", CJA and Associates, Inc., 8 pages, date unknown.
Tony Novak, "Target Benefit Annuity Plans: Retirement Plans for the Self–Employed," Life Insurance Selling, Sep. 1995, pp. 148, 150, 152, 154, 156 (5 pages).

* cited by examiner

Primary Examiner—Hani M. Kazimi
Assistant Examiner—Stefano Karmis
(74) Attorney, Agent, or Firm—Akin Gump Strauss Hauer & Feld, LLP

(57) ABSTRACT

A defined benefit pension plan, such as a plan described in Internal Revenue Code Section 412(i), is created using variable life insurance contracts and/or variable annuity contracts. Actuarial data used to create the defined benefit pension plan is entered via at least one user interface and processed. Based on the actuarial data, a variable life insurance policy and/or a variable annuity policy is generated for the purpose of funding the defined benefit pension plan. Additionally, a separate agreement is created that either extra-contractually modifies the variable life insurance policy and/or the variable annuity policy, or defines the terms under which the variable life insurance policy and/or the variable annuity policy is to be used in the defined benefit pension plan. Thus, a mechanism is provided to avoid violation of the Internal Revenue Service "incidental benefit rule" and to provide a guaranteed rate of return such that the variable life insurance contracts and/or the variable annuity contracts can be used in a plan described in a retirement plan, including a plan described in Code section 412(i).

16 Claims, 5 Drawing Sheets

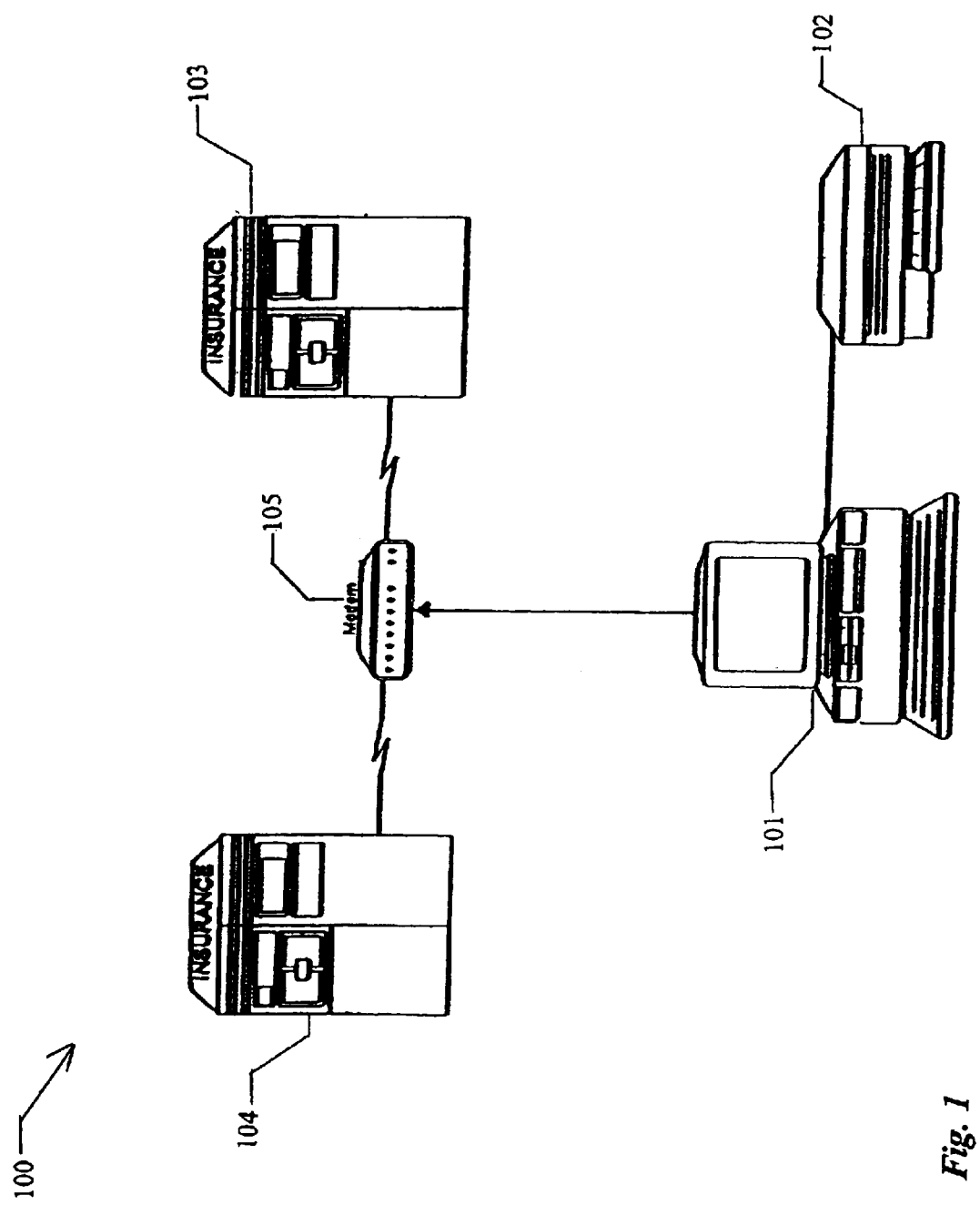

US 6,963,852 B2

SYSTEM AND METHOD FOR CREATING A DEFINED BENEFIT PENSION PLAN FUNDED WITH A VARIABLE LIFE INSURANCE POLICY AND/OR A VARIABLE ANNUITY POLICY

CROSS-REFERENCE TO RELATED APPLICATION

This application claims the benefit of U.S. Provisional Application No. 60/296,173, filed Jun. 6, 2001, entitled "System and Method for Creating a Defined Benefit Pension Plan Funded With Variable Life Insurance and Generating a Policy Thereof."

BACKGROUND OF THE INVENTION

Internal Revenue Code Section 412(i) covers defined benefit plans that are funded solely by annuity contracts and/or insurance contracts, including retirement income endowment contracts. A defined benefit plan is a retirement plan sponsored by an employer, such as a pension plan, in which a retired employee receives a specific monetary disbursement based on salary history and years of service, or both. A 412(i) plan is a defined benefit plan wherein the funding (annual contribution) is calculated under the rules of Code Section 412(i). It is also referred to as a fully-insured plan.

It is desirable to qualify a pension under Section 412(i) because qualifying plans are exempt from the funding requirements of Code Section 412. This includes exemptions from the minimum funding standard account, the full funding limitation, quarterly contributions, reasonable actuarial assumption interpretations, and the Schedule B Enrolled Actuary certification that is otherwise required to be filed with the Forms 5500 for the plan.

Generally, the requirements for qualification of a plan as a 412(i) plan are:

(1) The plan must be funded exclusively with annuity contracts or a combination of life insurance contracts and annuity contracts.

(2) The contracts must provide for level annual payments to begin when an individual becomes a plan participant and extending not later than the retirement date under the plan.

(3) The plan benefit must be provided entirely by the contracts and guaranteed by an insurance carrier to the extent premiums have been paid.

(4) Premiums payable for the plan year and all prior plan years under such contracts must have been paid.

(5) No rights under the contracts may be subject to a security interest during the plan year.

(6) No policy loans may be outstanding at any time during the plan year.

Since the plan benefits must be guaranteed by the insurance company that issues the life insurance contracts and the annuity contracts, the plan's actuarial assumptions may be based on the guaranteed values in the contracts. This means that the plan must fund for benefits based on the guaranteed annuity conversion factors in the contracts and must assume the pre-retirement interest assumption that is guaranteed in the life insurance contracts and/or the annuity contracts.

Traditional (prior art) 412(i) plans are constructed with traditional whole life or fixed rate annuity policies to fund benefits. Only whole life insurance has been used in a 412(i) plan because State insurance laws require that a guaranteed dividend be earned on such policies. Consequently, in the prior art, it was presumed that the policy's guaranty constituted the only way for the insurance company to satisfy the section 412(i) requirement that benefits be guaranteed. Generally, although such contracts have a guaranteed rate of return (usually 4.5% per annum or less), the potential upside investment performance is very limited because of conservative investments made by insurance companies. Limited upside performance has impaired consumer demand for whole life contracts, in general; and this has also impaired demand for 412(i) plans.

It would be advantageous to use a variable life insurance policy and/or a variable annuity policy in a 412(i) plan to take advantage of better tax treatment for the employer sponsoring the plan, while at the same time being able to reap higher returns on higher risk investment vehicles. However, the conventional belief is that one cannot use a variable life insurance policy and/or a variable annuity policy to fund a 412(i) defined benefit plan.

BRIEF SUMMARY OF THE INVENTION

The present invention is a method and system for using variable life insurance contracts and/or variable annuity contracts to fund a 412(i) defined benefit plan. The present invention enables variable life insurance contracts in a pension plan to operate similar to a traditional ordinary whole life insurance policy insofar as it basically provides death benefit coverage for life in a stipulated level amount as long as scheduled level premiums are paid as they fall due.

In accordance with the present invention, a computer-implemented data-processing scheme is used to create a defined benefit pension plan funded using variable life insurance contracts and or variable annuity contracts. Actuarial data (associated with an applicant for insurance under the defined benefit pension plan) is entered via at least one user interface. Based on the actuarial data, a variable life insurance policy and/or a variable annuity policy, and a separate agreement that extra-contractually modifies the variable life insurance policy and/or the variable annuity policy are electronically generated.

In accordance with another embodiment of the present invention, a computer-implemented data-processing scheme is used to create a defined benefit pension plan funded using variable life insurance contracts and or variable annuity contracts. Actuarial data (associated with an applicant for insurance under the defined benefit pension plan) is entered via at least one user interface. Based on the actuarial data, a variable life insurance policy and/or a variable annuity policy, and a separate agreement that defines the terms under which the variable life insurance policy and/or a variable annuity policy is to be used in the defined benefit pension plan are electronically generated.

In accordance with yet another embodiment of the present invention, a computer-implemented data-processing scheme is used to create a defined benefit pension plan funded using at least one of life insurance contracts and annuity contracts. Actuarial data is entered via at least one user interface, and is used to create the defined benefit pension plan. Based on the actuarial data, a life insurance policy and/or an annuity policy used to fund the defined benefit pension plan is electronically generated. Furthermore, a separate agreement that extra-contractually modifies the life insurance policy and/or an annuity policy is electronically generated.

A guaranteed rate of return may be determined for the defined benefit pension plan as a result of negotiations between a plan sponsor and the issuer of contracts used to fund the plan. After a predetermined period of time, it may be determined whether earnings based on funds contributed to the defined benefit pension plan exceed the guaranteed rate of return. If so, an "actual earnings" parameter may be set to determine future contributions to the defined benefit pension plan. The life insurance policy may be a variable life insurance policy and the annuity policy may be a variable annuity policy. A software illustration associated with the selected policy may be electronically generated based on information received from at least one remotely located processor that processed the actuarial data. The defined benefit pension plan may be a variable 412(i) defined benefit pension plan which includes the selected policy and the separate agreement. Funds contributed to the defined benefit pension plan are allocated between a General Account and a Variable Account.

In accordance with yet another embodiment of the present invention, a computer-implemented data-processing scheme is used to create a defined benefit pension plan funded using at least one of life insurance contracts and annuity contracts. Actuarial data is entered via at least one user interface, and is used to create the defined benefit pension plan. Based on the actuarial data, a life insurance policy and/or an annuity policy used to fund the defined benefit pension plan is electronically generated. Furthermore, a separate agreement that defines the terms under which the life insurance policy and/or the annuity policy is to be used in the defined benefit pension plan is electronically generated.

BRIEF DESCRIPTION OF THE SEVERAL VIEWS OF THE DRAWING

The following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1 shows a system architecture diagram according to the present invention;

DETAILED DESCRIPTION OF THE INVENTION

I. Overview of the Present Invention

Figure 2A:
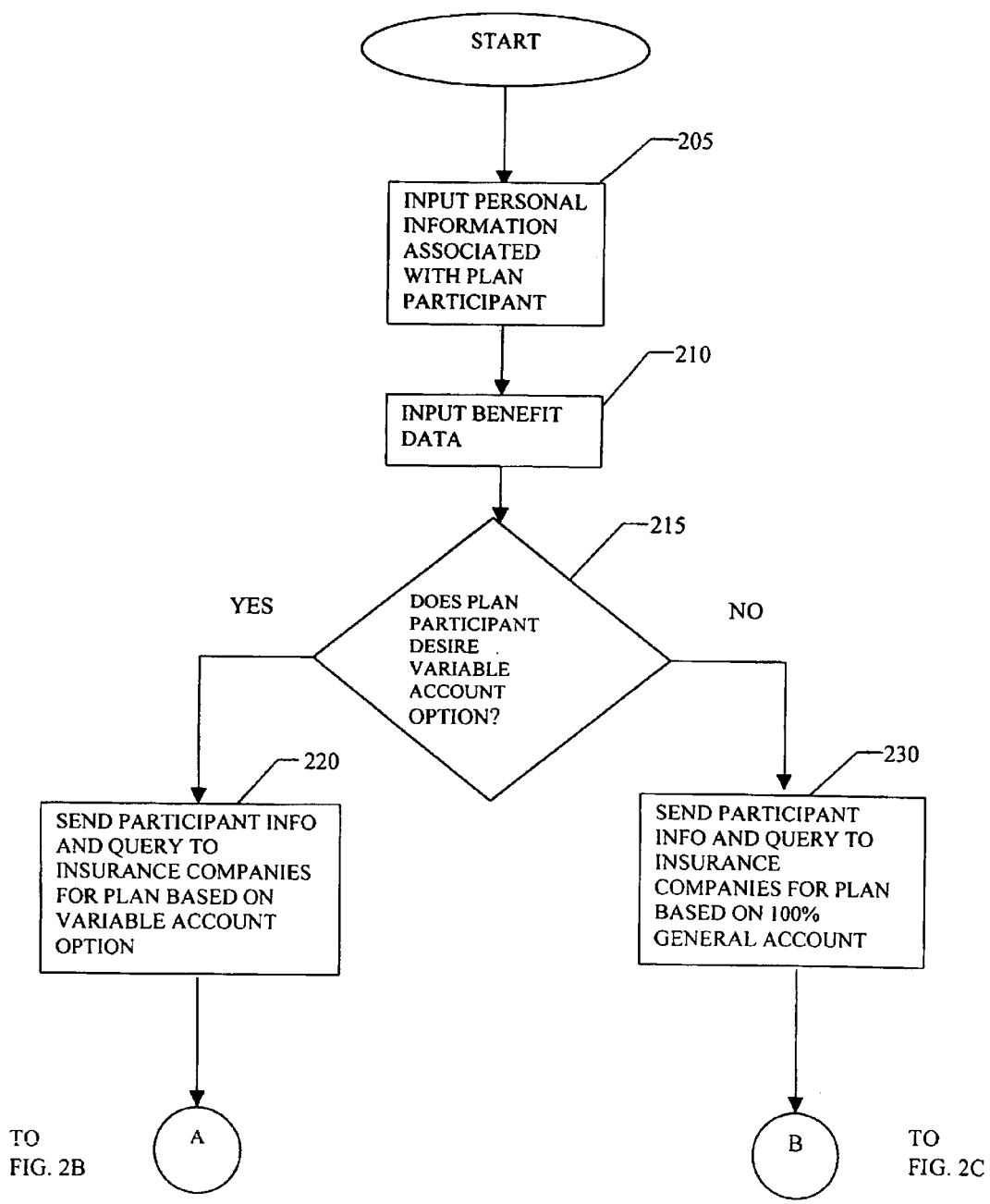
FIGS. 2A, 2B and 2C, taken together, show a flow chart according to the present invention.

The present invention provides a mechanism to avoid violation of the "incidental benefit rule," an Internal Revenue Service rule that denies qualified treatment to a defined benefit plan which provides life insurance in other than incidental amounts. The present invention does this by negating a policy option that may be ordinarily elected by a participant covered by the policy or plan fiduciary, under which the excess (if any) of the policy's cash value over the "tabular cash value" (essentially the net level premium reserve on a regular whole life policy having the same face amount and the same net premium as the policy) is added to the policy's face amount, with the total becoming the death benefit payable under the policy.

The present invention differs from a process based upon traditional ordinary whole life insurance policy only in that the policy employed in the process generally does not contain guaranteed (i.e., contractual) cash values with respect to amounts allocated to the variable account within the policy, itself. However, the present invention achieves the same effect by virtue of supplemental contractual provisions that either modify the obligations of the insurance company to the plan and the plan's participants or combine existing policies and riders to achieve the same end. Further, the present invention permits, in addition to the level premium payment schedule under the Policy, the payment of extra unscheduled premiums to the Policy, where such extra premiums do not directly affect the death benefit amount, but instead are allocated directly to the cash value, which can affect the death benefit but not to a significant degree.

In general, an insurance policy may be deemed to be ordinary whole life insurance for the purpose of applying IRS Revenue Ruling 54-51 if, by the terms of the policy, (1) the amount of the death benefit may not decrease, and (2) the contractual premium may not increase during the period which is the lesser of the lifetime of the participant or the time the policy remains in force. The variable 412(i) process described herein may be implemented using "off-the-shelf" variable contracts, as long as the investment vehicles of the variable life insurance policy comply with the requirements of the plan agreement. The variable 412(i) process permits use of "private placement" variable contracts, thus enabling insurance companies to link the newest developments in insurance design to the pension market. Use of variable contracts will make 412(i) plans more competitive against non-insured pension plans in the marketplace because investors will not have to compromise investment performance. Since the Internal Revenue Service has previously held that Revenue Ruling 54-51 appears to support the ideology that variable life insurance is a form of whole life insurance, such insurance can be implemented into a 412(i) defined benefit plan. The present invention uses "illustration software" to determine a life insurance and annuity premium which collectively comprise the annual contribution to the plan.

Present government regulations allow an insurance company and plan fiduciary to extra-contractually modify life insurance policies. Under Section 1.412(i)-1(b)(2)(ii) of the Internal Revenue Code, any policy may be supplemented by a separate agreement between the Plan and the Insurer in order to comply with the requirements of section 412(i). The present invention requires the creation of a new, specialized contract which operates as a modification to the terms of the Insurer's life insurance policy and/or annuity policy when used in the context of a section 412(i) plan. This is an important feature of the present invention, in part, because it allows the Plan to be offered without requiring the Insurer to obtain special approval of the life insurance contracts and/or the annuity contracts from various State insurance regulators to reflect the terms of certain extra-contractual modifications comprising part of the present invention. Moreover, because of the aforesaid regulations, the extra-contractual modifications appear to require no additional approval from the IRS, provided that the modifications reflect the regulations.

Another significant element of the present invention is the process by which the Insurer is able to guaranty the plan benefits. The present invention contemplates that the variable 412(i) process will utilize one or more different methods for hedging the uncertain rate of return inherent in a variable product against the guaranteed rate of return contemplated in a 412(i) plan. The hedging methods utilized to minimize risk to the insurance carrier include:

(1) Allocating contributed funds between a General Account (e.g., 25%) and a Variable Account (e.g., 75%) to reduce the effective guaranty against the variable portion, because the general account has a guaranteed rate of return (e.g., 4%). Thus, the plan fiduciary may devote a percentage of plan contributions to the variable subaccounts of the variable life insurance contracts and/or variable annuity contracts (between 0% and 100%) to increase the probability of higher investment performance while significantly reducing the effective guaranty risk suffered by the insurance company.

(2) Internal investment of insurance companies may be hedged to account for risk related to the guaranty on the variable policy in the 412(i) plan.

(3) The insurance company can charge higher mortality rates and/or expense charges for policies used in the variable 412(i) plan.

(4) Commissions payable to agents for the policies used in the variable 412(i) plan may be decreased.

(5) Allocating contributed funds among equity, bond, money market or other components of available variable subaccounts, without the necessity for the allocation to the General Account; e.g., 50% equities, 30% bonds, and 20% money market.

(6) Hedging may also be implemented with a "guaranteed income rider" (if the company has it available) in order to provide a guaranteed rate of return for the variable annuity and/or the variable life insurance portion of the 412(i) funding.

(7) Rather than allocation to the general fund in the variable contract (method (1) above), a percentage of the allocation can be made to life insurance contracts and/or annuity contracts with guaranteed minimum rates of return, while the remainder of the contribution can be invested in variable contracts.

(8) The guaranty of the insurer may also be provided through reinsurance or a contract of indemnity, guaranty or suretyship.

In some of the hedging methods contemplated by the present invention, the insurance company may indicate that in order to receive a particular guaranteed return, the participants' funds must be invested among various accounts; e.g., 25% in a guaranteed account, 40% in any variable subaccount, and 35% in a particular subaccount.

The advantages of such a plan include that no planned fee is charged for actuarial certification by an Enrolled Actuary, fiduciary risks are reduced, and the lower the actuarial assumption, the greater the probability of a higher long-term rate of return because of accelerated income tax benefits.

In a computer-implemented method for drafting a section 412(i) plan agreement, the method steps include:

(1) Select an insurance company through which a policy is to be employed.

(2) Obtain a guaranteed amount for the policy, including the rate of the return the insurance company guarantees on invested funds.

(3) Determine the allowable deduction.

(4) Determine the maximum premium to spend on insurance.

In accordance with the present invention, the variable 412(i) process is constructed with variable life insurance and/or variable annuity products, a plan design feature not previously available in the market. Variable contracts have emerged as the product of choice among consumers. Variable contracts offer substantially increased upside investment potential over traditional whole-life contracts, because of the ability to allocate cash invested in the insurance contract to various mutual fund sub-accounts.

Traditional 412(i) plans measure tax deductions by reference to the insurance company's guaranteed rate. At a typical 4% guaranty, the maximum deduction for a 55 year old male retiring at age 65 is approximately $170,000 per year. While this deduction is substantially higher than a non-fully-insured defined benefit plan, the transaction is heavily weighted toward tax considerations instead of long-term economics.

Variable 412(i) plans measure tax deductions by reference to a negotiated guaranteed rate. At a negotiated 2.5% guaranty, the maximum deduction for a 55-year-old male retiring at age 65 is approximately $270,000 per year (in 2001). The tax deduction potential for variable 412(i) is substantially higher than a non-fully-insured defined benefit plan and traditional 412(i) plans. While the arrangement maintains considerable tax advantages (due to accelerated deductions), variable contracts reduce the compromises of long-term economics one normally sees in a pension plan funded with insurance products.

More product sales within plans for insurance companies may occur because the present invention makes 412(i) plans much more competitive with traditional plans funded with securities. A more competitive product leads to greater sales. Multiple product sales may occur due to the offering of variable life insurance and annuities. Since the Internal Revenue Service has ruled that only 50% of the contribution to a plan can be for "whole life" insurance, approximately half of the plan contribution will normally be used to purchase annuity contracts. The larger potential market and deductions (as compared to plans without the present invention) may lead to increases in sales of both insurance and annuity products.

The present invention is a significant positive change to the process of insured pension plan implementation. Users of the present invention will be able to claim market ingenuity and leadership, resulting in increased goodwill and sales.

II. Detailed Disclosure

To implement the present invention, a system and method for presenting a defined benefit pension plan funded with variable life insurance contracts and/or variable annuity contracts and generating a policy thereof will now be disclosed. In accordance with the present invention, the participant or plan fiduciary is given the option of allocating any portion of the plan's Accumulation Value to a "Variable Account." The Variable Account is an account designated by the plan to hold the net premiums and Accumulation Value under the plan to support variable life insurance benefits. The Variable Account is an account designated by the plan which is not part of a "General Account" and is designed primarily for investment in mutual funds (sub-accounts) which invest primarily in stocks and other types of debt and equity securities. The Variable Account may also be referred to in some cases to as a "Separate Account." The General Account is an account designated by the plan to hold the net premiums and Accumulation Value under the plan which are not designated for investment in the Variable Account. The General Account may also be referred to in some cases as the "Fixed Account" and is part of the assets of the Insurance Company.

The rate of return of the General Account is guaranteed by the insurance company, as per State regulations. Using the present invention, anywhere from 0% to 100% of premiums may be invested in the General Account. Also, using the present invention, anywhere from 0% to 100% of the premiums may be invested in the Variable Account. Under normal circumstances, it would not be expected that an insurance company would permit the plan sponsor to allocate more than 75% of the premiums (plan contributions) to the Variable Account. However, the present invention provides total flexibility to the insurance company and plan sponsor to modify the allocation by agreement, as outlined above. Furthermore, the structure agreed to between the plan and the Insurer may involve the purchase of a standard guaranteed policy as well as a variable policy, with no restrictions on the allocations in the variable policy.

FIG. 1 shows a system architecture diagram of a computer system 100 in accordance with the present invention. In the computer system 100, a computer 101, which may be simply a personal computer (PC), is connected to a printer 102. Computer 101 serves as a user interface for entering actuarial data associated with an applicant to a defined benefit pension plan. The computer 101 is also coupled via a computer-to-computer communication device, such as, for example, a modem 105, to computer systems of a plurality of insurance carriers 103, 104. Printer 102 is used to print out policy software illustrations and plan agreements. The computer system 100 may be used by a defined benefit pension plan representative, an employer representative or an insurance broker to generate plan presentations and plan agreement policies, and obtain quotes from different insurance companies in accordance with the present invention. The computer system 100 may also be used by an applicant who is looking for direct information from the insurance companies via the World Wide Web (e.g., the Internet).

Referring now to FIG. 2A, personal information (actuarial data) associated with participants to a defined benefit pension plan is inputted into computer 101 (step 205). The personal information includes basic information such as the date of birth of an individual plan participant (used to determine age), whether the individual plan participant is a smoker or non-smoker, whether the individual plan participant is a male or female, etc. Next, data associated with the intended benefits under the defined benefit pension plan is entered into computer 101 or at a different user interface (step 210). The benefit data includes retirement goal and desired death benefit information associated with a life insurance policy and/or an annuity policy incorporated into the plan.

In accordance with the present invention, the plan fiduciary or sponsor is queried as to whether a Variable Account plan option is desired (step 215). The query may be a blank space on a plan application that needs to be filled in, or the query may be presented in the form of a text or audible question presented over an electronic medium. The query may be answered by a third party (e.g., a plan representative or insurance agent) who has been in physical and/or audible contact with the plan participant. If the Variable Account option is desired, the participant's information and a query for plan information based on the Variable Account option is sent to insurance companies 103, 104 (step 220). If the Variable Account option is not desired, the participant's information and a query for plan information based on the General Account being funded at a 100% level is sent to insurance companies 103, 104 (step 230).

Figure 2B:
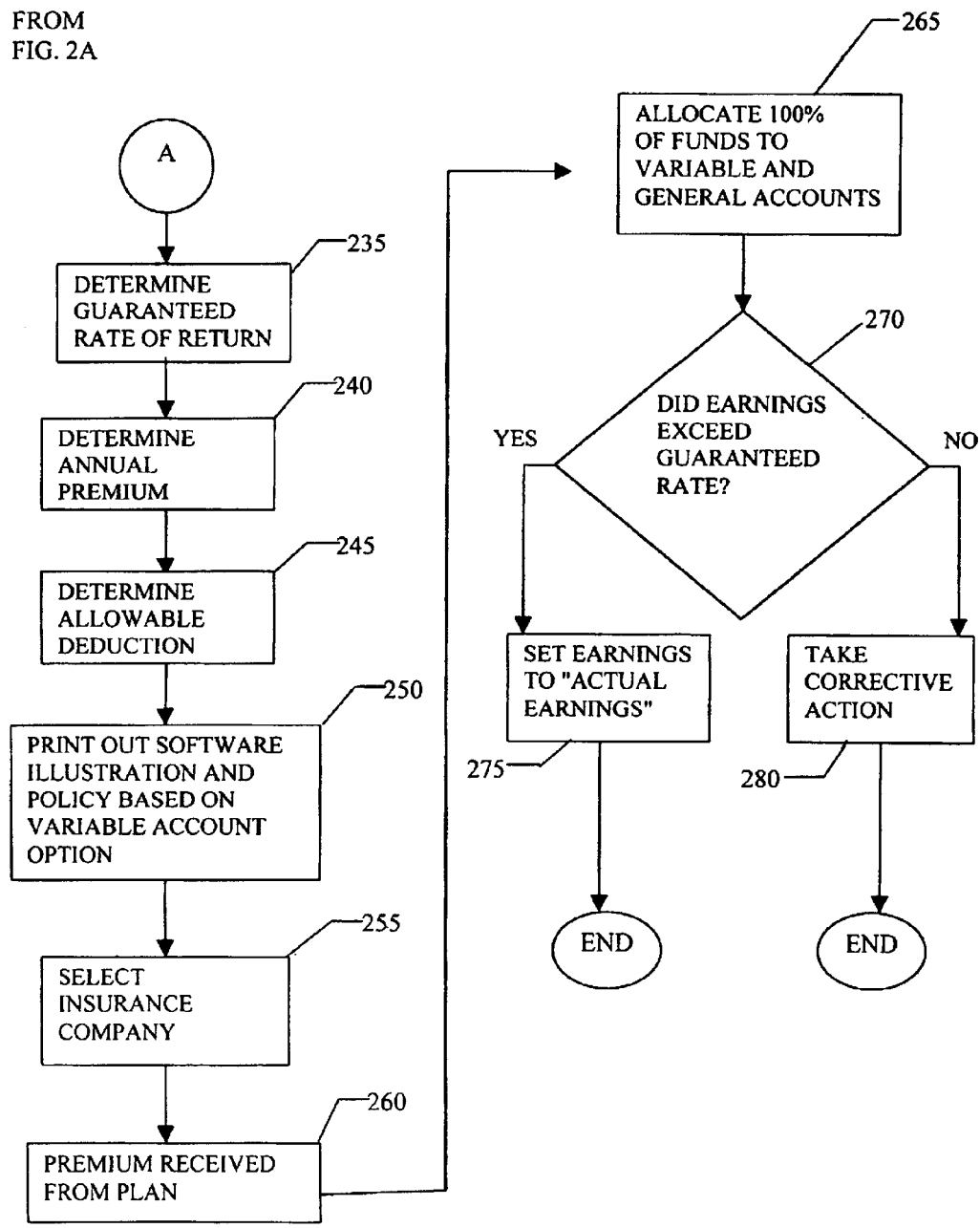

Referring now to FIG. 2B, in response to step 220, each insurance company that has a Variable Account option available, determines a guaranteed rate of return by reference to an insurance contract fixed account, or other insurance company promise in a policy, rider or agreement (step 235). The plan sponsor selects an insurance company whose products are intended to be used in conjunction with the plan. Software provided by the selected insurance company is used for computations. The insurance company software, after considering the inputted benefit data and actuarial data, renders an annual premium amount necessary to fund the benefits contemplated for each participant (step 240). This, in turn, forms the basis for an allowable income tax deduction for the plan (step 245). A policy software illustration and an actual policy based on the Variable Account option are printed out on printer 102 (step 250). If the premium, coverage, and benefits to be generated by the annuity and/or life insurance policies are acceptable, the plan sponsor will choose the insurance company to provide the coverage and benefits (step 255). The applications for coverage are signed and forwarded to the insurance company. If the applications are not accepted by the insurance company, applications will be made with other insurance companies until they are accepted. When coverage is offered, the plan fiduciary or sponsor then accepts the offer of coverage from the insurance company, signs necessary policy documentation, and forwards each to the insurance company along with the necessary premiums. Once the accepting insurance company receives the premiums (step 260), funds drawn from the premium are allocated to the Variable and General Accounts as determined by the agreement between the insurance company and the plan sponsor (step 265). After a predetermined period of time (preferably one year), a determination is made as to whether earnings based on the funds exceed the guaranteed rate of return (step 270). If so, then the earnings of the plan are set to "actual earnings" (step 275). If not, then corrective action may be taken by the insurance company (step 280). Such corrective action may include asset re-allocation, internal hedging of the insurance company's investments, increased mortality charges or expense charges, or by making a mandatory request to the plan fiduciary to allocate the Variable Account into a plurality of sub-accounts in a manner determined by the insurance company.

Figure 2C:
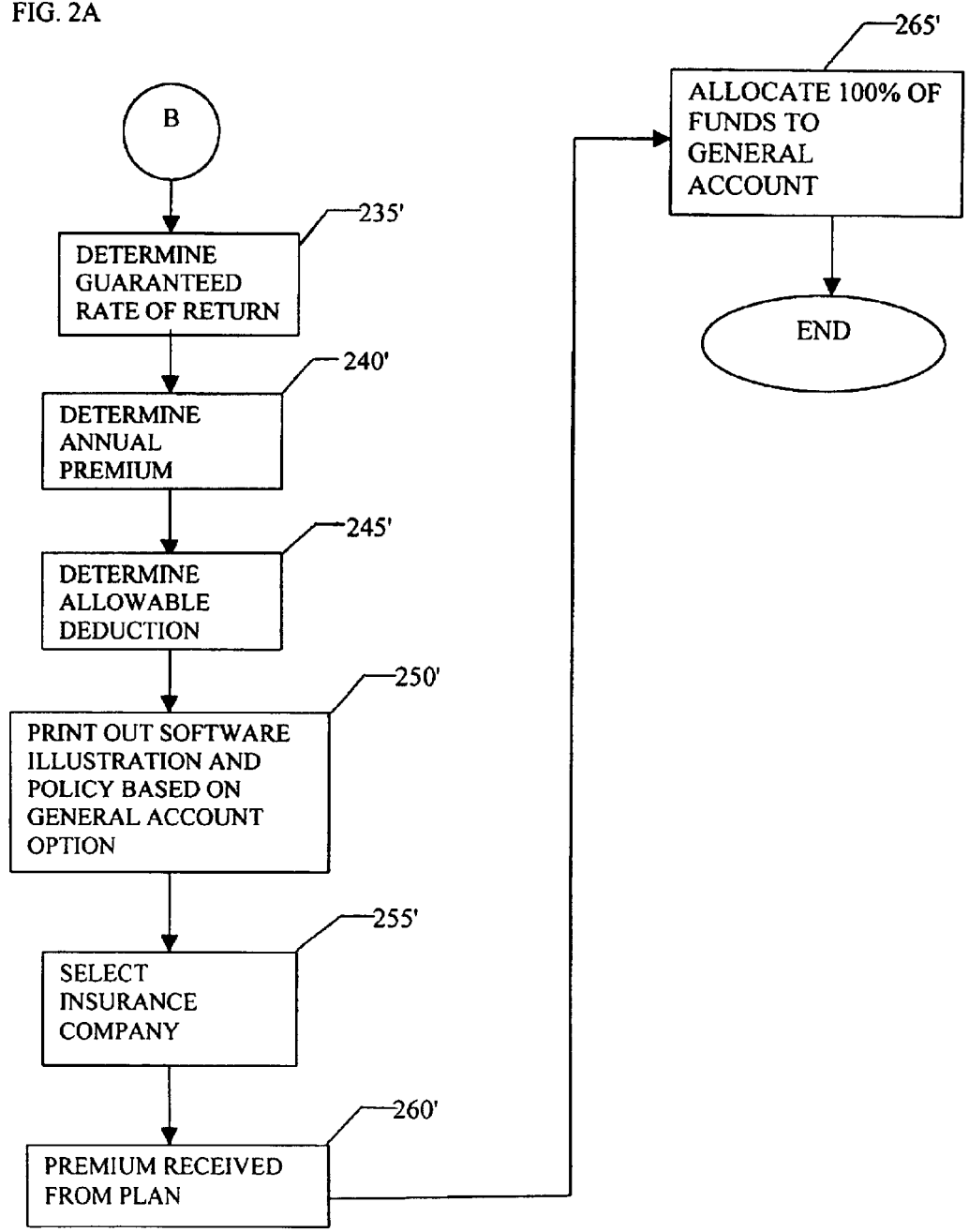

Referring now to FIG. 2C, in response to step 230, each insurance company that has a General Account option available, determines a guaranteed rate of return (step 235'). The plan sponsor selects an insurance company. Software provided by the selected insurance company is used for computations. The insurance company software, after considering the inputted benefit data and actuarial data, renders an annual premium amount necessary to fund the benefits contemplated for each participant (step 240'). This, in turn, forms the basis for an allowable income tax deduction for the plan (step 245'). A policy software illustration and an actual policy based on the General Account option are printed out on printer 102 (step 250'). If the premium, coverage, and benefits are acceptable, the plan sponsor will choose the insurance company to provide the coverage and benefits (step 255'). Once the accepting insurance company receives the premiums from the plan (step 260'), funds drawn from the premium are 100% allocated to the General Account (step 265').

Figure 3:
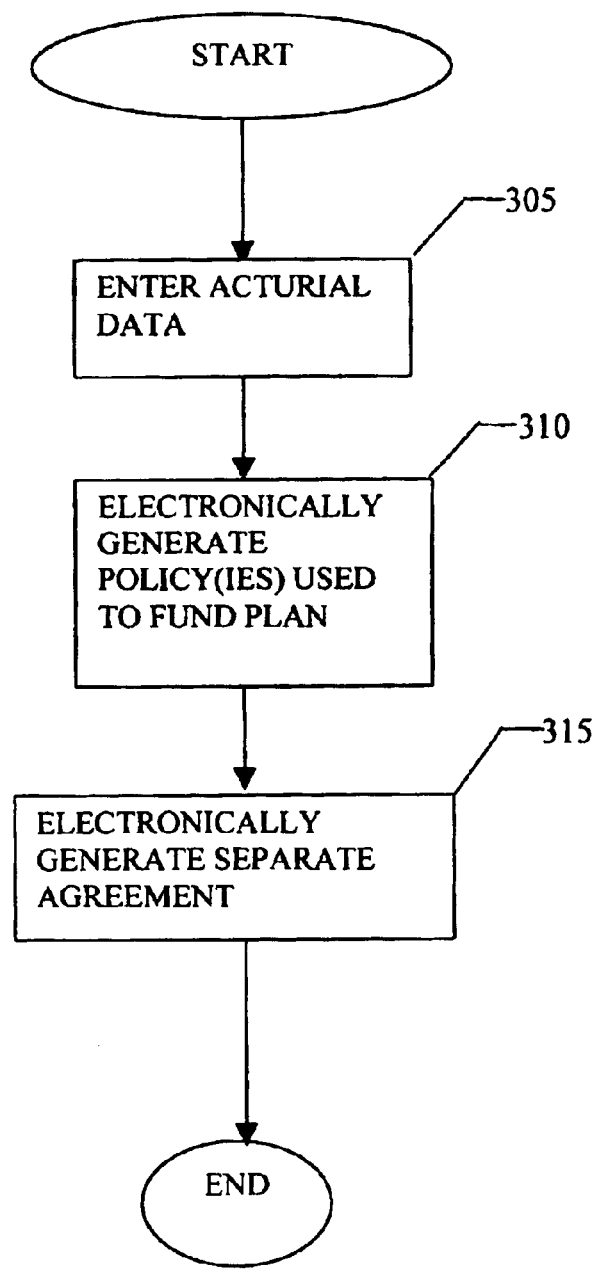
FIG. 3 shows a simplified scheme of creating a defined benefit pension plan in accordance with a preferred embodiment of the present invention.

FIG. 3 shows a simplified scheme of creating a defined benefit pension plan funded using life insurance contracts and/or annuity contracts in accordance with a preferred embodiment of the present invention. As previously described, actuarial data is entered into a user interface (step 305) (e.g., see computer 101 in FIG. 1). Based on the actuarial data, and data related to the benefits of the defined benefit pension plan that is to be created (e.g., plan design data), one or more policies used to fund the defined benefit pension plan are electronically created by at least one processor (step 310). The policies include a life insurance policy and/or an annuity policy. The life insurance policy may be a variable life insurance policy. The annuity policy may be a variable annuity policy. A separate agreement is also electronically generated (step 315). The separate agreement either extra-contractually modifies the selected policy, or it defines the terms under which the selected policy is to be used in the defined benefit pension plan. Thus, a defined pension benefit plan is created that includes at least one of a life insurance policy and/or an annuity policy, and the separate agreement.

Many of the steps described above may be performed by a plan representative, insurance agent, or plan provider prior to the time in which a specific plan applicant requests a policy. For example, a table of data (i.e., generated by policy illustration software) may be pre-generated showing costs, premiums, and the like, for a plurality of different potential plan applicants and policy details.

The present invention is further explained in Appendices A and B which contain the following contents:

Appendix A is an example of a Section 412(i) Plan Agreement in accordance with the present invention. In this example, the guaranty is 2.5%, and the Insurer may require that at least 25% of available funds be allocated to the General Account and no more than 75% of available funds shall be allocated to the Variable Account. The Section 412(i) Plan Agreement (and modifications thereof contemplated by the present invention) is an integral component of the present invention, itself being generated by entry of the data into a computer word processing program that produces the agreement on a printer.

Appendix B is a copy of Letter Ruling 9014068 (1990) based on IRS Code Section 401 describing an ordinary whole life insurance policy within the meaning of IRS Revenue Ruling 54-51. Although Appendix B is directed towards the funding of a defined benefit pension plan using a life insurance policy, it should be understood that in an alternate embodiment, a variable annuity policy may also be used to fund a defined benefit pension plan in accordance with the present invention The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention, including the use of any variable insurance contracts and/or variable annuity contracts to fund a defined benefit plan or annuity plan. In the present invention and appended claims, the term "variable insurance contract" includes a life insurance contract or annuity contract which permits fixed or flexible premiums and/or fixed or flexible death benefits in its form as filed with an appropriate insurance authority (also known as "Universal" contracts).

APPENDIX A

SECTION 412(i) PLAN AGREEMENT

AGREEMENT made this _____ day of _____, 2001 by and between _____ (hereinafter referred to as "Sponsor") and _____ Insurance Company (hereinafter referred to as the "Insurer").

BACKGROUND

A. Sponsor has developed a fully-insured pension plan program (the "Plan") which is designed to comply with section 412(i) of the Internal Revenue Code of 1986, as amended ("Code") and other applicable provisions of the Code and the Employee Retirement Income Security Act of 1976, as amended ("ERISA"); and B. Sponsor desires to offer the Plan to various employers throughout the United States who wish to offer pension benefits to employees of such employers; and C. Sponsor desires to use certain variable life insurance policies (the "Policies") of Insurer, both of the retail and private-placement variety, as the funding medium for the benefits to be provided under the Plan; and D. The Policies may not contain each and every characteristic required by the Code and Treasury Regulations interpreting section 412(i); and E. Reg. Section 1.412(i)-1(b)(2)(ii) provides that any Policy may be supplemented by a separate agreement between the Plan and the Insurer in order to comply with the requirements of section 412(i); and F. Insurer desires that its Policies be used in the Plan and that the terms and conditions set forth in this Agreement shall operate to supplement the terms and conditions of the Policies solely for the purposes of the legal relationships established under the Plan.

NOW THEREFORE, in consideration of the premises and the mutual promises contained herein, and intending to be legally bound, the parties agree as follows:

OPERATIONAL PROVISIONS

1. Incorporation of Background. The foregoing Background paragraphs are incorporated by reference as if set forth in full.

2. Agreement by Insurer to Terms. The Insurer, desiring that its Policies be used in the Plan, agrees that any such Policy used in the Plan shall be governed by the terms of this Agreement, notwithstanding any inconsistent provision contained in the terms of each Policy.

3. Section 412(i) Funding Requirements.

a. Level Funding. Premium payments for each Policy shall be made in a level amount, paid annually or more frequently.

b. Funding Period. Premium payments shall be designed to
  i. begin on the date an individual participant becomes a participant, and
  ii. end not later than the normal retirement age (as defined in the Plan) for such individual or, if earlier, the date the individual ceases his participation in the plan.

c. Experience gains and dividends. Experience gains, dividends, and other credits shall be applied against premiums next due under the Policy (not later than the due date for same) before any further contributions made by an employer are so applied, and the application of same to payment shall not be deemed to violate the level funding requirement of paragraph 3(a).

d. Increased benefits. If benefits under the Plan are increased, any increase in premium payment attributable to such increased benefits shall be levelized prospectively within the allowable funding period beginning on the first payment date under the Policy occurring after the individual becomes a participant or the date of the benefit increase, whichever is applicable.

e. Extended participation. If an individual accrues benefits after his normal retirement age, payments under the Policy shall be permitted during the time such benefits accrue.

4. Guarantee of Benefits. For purposes of calculating benefits under the Plan attributable to each Policy, the Insurer agrees to the following provisions to the extent premiums have been paid.

a. Minimum Rate of Return if Variable Account chosen. If the Owner of the Policy chooses to allocate any portion of the Policy's Accumulation Value to a Variable Account, this paragraph shall govern the minimum benefits under the Policy, as follows:

i. The Insurer agrees to guaranty benefits based upon a rate of return under each Policy equal to two and one-half percent (2.50%) per annum (the "Guaranteed Rate").

ii. If, however, the earnings attributable to each Policy in a given year under the Insurer's customary method of calculating Policy earnings ("Actual Earnings") shall exceed the Guaranteed Rate, such earnings under the Policy for the policy year shall be the Actual Earnings.

b. Required Fund Allocations. As a condition of the Minimum Rate of Return, the Insurer may require that funds within each Policy be allocated in a particular manner among the types of mutual funds available as investment choices within each Policy. For purposes of this paragraph, the insurer may require that at least 25% of available funds be allocated to the General Account and no more than 75% of available funds shall be allocated to the Variable Account.

c. If 100% of the Policy's Accumulation Value is in the General Account, the provisions in the Policy governing such event shall supercede the provisions in paragraphs a. and b. hereof.

d. Settlement Option. The Insurer guaranties that each Policy may be exchanged for a single-life annuity or joint-and-survivor annuity, as the case may be, at such time as benefits under the Plan are to commence for each eligible participant; and the Insurer further guaranties the payment of each such annuity on terms no less favorable than those available for any other policy of the Insurer.

e. Definitions. For purposes of this paragraph, the following definitions shall apply to the terms used herein.

i. General Account—the account designated by the Policy to hold the net premiums and Accumulation Value under the Policy which are not designated for investment in a Variable Account. The General Account is referred to in some cases as the "Fixed Account" (depending on the Policy) and is part of the assets of the Insurer.

ii. Variable Account—the account (and its component subaccounts) designated by the Policy to hold the net premiums and Accumulation Value under the policy to support variable life insurance benefits. Regardless of the name by which it is called, the Variable Account is the part of the Policy which is not part of the General Account and is designed primarily for investment in mutual funds (subaccounts) which invest primarily in stocks and other types of debt and equity securities. The Variable Account is referred to in some cases as the "Separate Account" (depending on the Policy).

The Insurer shall notify the Policyholder in advance of its classification of each type of Account and shall make such classifications on the basis of standards customarily employed in the insurance and investment industries.

f. Death Benefit Options. The Owner shall not have the ability to increase death benefits pursuant to any provisions in the Policy commonly referred to as "Option 2" or "Option B" or otherwise so as to cause noncompliance with the "incidental benefit rule" as articulated in Treas. Reg. §1.401-1 (b)(1)(i) and the Revenue Rulings and other authority interpreting same.

5. Security Interests. No rights under any Policy may be subjected to a security interest of whatever nature.

6. Policy Loans. No loans shall be available to the Plan or any individual participant from cash surrender values contained within a Policy. Notwithstanding the foregoing, the Insurer may apply Policy values to pay premiums which come due so long as the amount of funds so applied, and any interest thereon, is repaid during the plan year in which such funds are applied and before distribution is made or benefits commence to any participant whose benefits are reduced because of such application.

7. Exclusive benefit. No value under any Policy providing benefits under the Plan or credits determined by the Insurer (on account of dividends, earnings or other experience rating credits, or surrender or cancellation credits) with respect to such policies may be paid or returned to the Employer or diverted to or used for other than providing retirement annuities for the exclusive benefit of Plan participants or their beneficiaries.

8. Mistake of fact contributions. Any contributions received by the Insurer because of a mistake of fact must, after certification of same by Sponsor, be returned to the Employer within one year of the contribution.

9. Distributed contracts. Any credits on account of dividends, earning or other experience rating credits, or surrender or cancellation credits, in excess of Plan benefits with respect to policies distributed to provide plan benefits, will be applied consistent with paragraph 4c, above.

10. Post-termination accruals. If upon the cessation of benefit accruals or upon Plan termination, all benefits provided under the Plan have been purchased with respect to service before cessation of benefit accruals or termination, any credits on account of dividends, earnings or other experience rating credits, or surrender or cancellation credits with respect to policies under the Plan shall revert to the Employer or be otherwise applied consistent with the terms of the Plan.

11. Proportionality of credits to Policies. Where credits are applied by the Insurer before Employer contributions are made such that the sum of the credits and contributions are sufficient to pay premiums next due, such credits shall be applied proportionately toward each premium next due so that the same percentage of each premium next due is paid.

12. Representations of Insurer. The insurer represents and warrants that its Policy has the following characteristics:

a. The policy has a specified level face amount (or can be illustrated with a specified level face amount for use in the Plan).

b. Both the coverage period and the premium payment period extend from the issue of the Policy to the earlier of the insured's death or the attainment of age _____.

c. The policy gives the owner the right to direct that the cash value (consisting of the accumulation of past and current net premiums together with interest thereon) be invested in a Variable Account (consisting of various mutual fund portfolios chosen by insurer as available subaccounts) or in a General Account of the Insurer.

d. The cash value of the Policy will vary in accordance with the investment experience of the components of the Variable Account, and is not guaranteed as to amounts in the Variable Account except as otherwise provided herein.

e. The death benefit under the Policy cannot fall below the aforementioned face amount so long as the premiums are paid in the amount and at the times specified in the Policy.

f. The death benefit under the Policy can increase or decrease the face amount to the extent necessary to satisfy section 7702 of the Code.

g. The Policy may contain a provision commonly referred to as "Option 2" or "Option B" (which, generally, adds cash value to the death benefit), however the Policy used in connection with the Plan will be illustrated and operated without reference to same.

h. The Policy contains a settlement option which will permit payment of a single-life or joint and survivor annuity at the normal retirement age of the insured.

i. The Insurer is licensed under the law of a State of the United States of America or District of Columbia to do business with the Plan.

13. ERISA Pre-emption. The parties are entering into this agreement based upon the good faith understanding that these provisions are "affecting an employee benefit plan" described in ERISA section 3(2) and Code Section 412(i) by virtue of the mandates contained in Code section 412(h)(2) added by section 1013(a) of the Employee Retirement Income Security Act of 1974 (88 Stat. 914); and these provisions are, therefore, pre-empted from state regulation by operation of ERISA section 514.

14. Fiduciary responsibility.

a. Except to the extent that the Insurer holds Plan assets in the form of insurance or annuity contracts, and to the extent not inconsistent with ERISA, the patties acknowledge that Insurer is simply a provider of product for the Plan and shall have no liability with respect to operation of the Plan or any tax issues arising in connection therewith.

b. Insurer's obligations to provide Plan benefits are expressly limited to the value of each Policy and annuity contracts purchased by the Plan Trustee or Administrator for the provision of benefits.

c. Sponsor represents and warrants that each employer who adopts a Plan funded with a Policy of the Insurer shall execute such documentation as necessary to confirm employer's acknowledgment of Insurer's limited responsibility with respect to the Plan.

15. Duration. Except as otherwise provided herein, this Agreement shall continue with respect to Policies purchased by a Plan until such time as such Policies are surrendered by the Plan or benefits are paid. Insurer may discontinue its participation in the aforesaid section 412(i) program, and cease issuing policies subject to this agreement, effective sixty (60) days after delivery of written notice to Sponsor. Upon such termination, Insurer shall, at its expense, immediately deliver to Sponsor all materials, whether in written or electronic format, tangible or intangible, having any reference whatsoever to pension plans funded with variable life insurance, variable annuities, or private placement life insurance and cease any business in connection with same.

16. Intellectual Property. The parties agree and acknowledge that the business process contemplated and permitted pursuant to this agreement is the intellectual property and confidential information of _____, his heirs, personal representatives, successors and assigns. The parties are on notice of _____'s application or intention to make application for patent protection with respect to the business processes described or alluded to herein, By virtue of this agreement, the parties agree that this agreement and the business process (of creating a method for variable life insurance contracts to be used in a pension plan) revealed hereunder is confidential and proprietary and shall not be used in any way by any party hereto, their successors, officers, employees, directors, agents, creditors, partners, shareholders, fiduciaries, or assigns, or revealed to any person or entity without the express written consent of _____. The parties agree to legal and/or equitable relief to enforce this agreement, regardless of the existence of a remedy at law, and consent to venue and personal jurisdiction in the Court of Common Pleas of _____ or such other court in the _____ chosen by _____, and waive any right to removal. Because of the difficulty in measuring damages, the parties agree that _____ shall be entitled to liquidated damages of $_____ per violation of this agreement, plus reasonable attorney fees, expenses of litigation, and costs of suit. Without limiting the generality of the foregoing, each use of the aforesaid business process in connection with marketing or implementing a retirement plan, and each document in which such unauthorized use appears, without the permission of _____, regardless of the number, shall be a separate violation. In any action hereunder; the parties irrevocably authorize any attorney of any court of record or prothonotary to appear for such party in violation and to confess or enter judgment by confession for all amounts allowed hereunder, including statutory interest, in favor of _____, upon presentation of an affidavit of default and damages and a copy of this agreement. The right to enter judgment by confession granted hereunder shall not be exhausted by any single exercise, but judgment may be confessed as aforesaid from time to time and as often as amounts due hereunder shall become due, and shall survive any oral or written modification to this agreement. The parties agree to service of process by certified mail addressed to the address for a party set forth herein or to such other address provided by a party in writing to the other. This provision shall survive indefinitely to the benefit of _____, his heirs, personal representatives, successors and assigns, regardless of any cancellation or modification of this agreement or the failure of any party to execute same.

17. Integration. This Agreement represents the sole agreement of the parties with respect to the subject mailer hereof, superceding any and all prior written or oral agreements. This Agreement may be amended only by a writing executed by the parties.

18. Choice of Law. This Agreement shall be interpreted and adjudicated consistent with the laws of the _____, without giving application to principles of conflict of laws, except to the extent such law may be pre-empted by federal law. Issues of jurisdiction, venue, remedy and service of process shall be governed in the same fashion as set forth in paragraph 16. The parties acknowledge that the foregoing are material components to this agreement and waive objection to venue on the basis of forum non-conveniens or any similar theory.

19. Parties bound. This Agreement shall inure to the benefit of and bind the parties hereto, their affiliates, joint venturers, partners, subsidiaries, independent contractors, agents, creditors, employees, directors, shareholders, heirs, personal representatives, successors, and assigns, as the case may be.

20. Interpretation. In construing this Agreement, the parties intend that the singular shall include the plural, references to male gender shall include female, and that technical terms relating to policies shall have the meanings commonly employed in the insurance and securities industries.

21. Copies and Counterparts.
   a. This Agreement may be executed in any number of counterparts, the collection of which shall form the whole of the Agreement.
   b. The parties shall be entitled to rely on signatures transmitted by fax or other electronic medium, provided such transmission includes a transmission receipt evidencing the source and time of same, and the sending party confirms same by delivering an original signature on such document to the receiving party within two (2) business days.
   c. The parties agree that the issuance of a Policy in connection with a Plan shall constitute Insurer's agreement that such Policy be governed by this Agreement, without need for execution of a new copy of this Agreement. Therefore, Sponsor is authorized to attach a true and correct copy of this Agreement to each Plan adopted by each employer who adopts such Plan, and to similarly attach a copy of same to each application for ruling or determination that Sponsor makes to the Internal Revenue Service or Department of Labor in connection with any such Plan.

IN WITNESS WHEREOF, the parties have by their authorized officers affixed their signatures on the date first above written.

| ATTEST: | INSURER |
|---|---|
| ———— | BY:_____(SEAL) |
| Name:_____ | Name:_____ |
| Title:_____ | Title:_____ |
| ATTEST: | SPONSOR |
| ———— | BY:_____(SEAL) |
| Name:_____ | Name:_____ |
| Title:_____ | Title:_____ |

Appendix B

Ltr. Rul. 9014068
Code Sec. 401
 * Sec. 401 Issues: Qualified pension, profit-sharing, and stock bonus plan—Plan termination payments by defined benefit plans.
<<FULL TEXT>>
In your letter of _____ you requested, on behalf of the Plan, rulings on the application of the "incidental death benefit rule" to the purchase by the Plan of the Policy as part of the funding of benefits for participants of the Plan _____ which issues the Policy, is a wholly owned subsidiary of the _____ which in turn is the employer and sponsor of the Plan. The Plan is a qualified defined contribution plan which by its terms permits a participant to elect to have a certain portion of his/her Plan contributions used as premiums for a Policy on his/her life.

FACTS

The Policy has a level face amount. Both the Coverage period and the premium payment period extend from the issue of the Policy to the earlier of the participant's death or the participant's attainment of age 100.

The Policy gives the participant covered thereunder the right to direct that the cash value (consisting of the accumulation of past and current net premiums together with interest thereon) be invested in shares of various mutual fund portfolios of the _____. The cash value of the Policy will vary in accordance with the investment experience of these mutual fund portfolios and is not guaranteed as to amount. The death benefit under the Policy is however not affected by the amount of the Policy's cash value, except to the extent noted hereafter.

As long as premiums are paid in the amount and at the times specified in the Policy, the death benefit cannot fall below the aforementioned face amount. There are however two circumstances when the death benefit will exceed that amount:

(1) whenever the Policy's cash value exceeds the net single premium for that face amount of level lifetime death benefit, the Policy provides that the death benefit is increased to the amount necessary to satisfy section 7702 of the Internal Revenue Code (the "Code");

(2) under the Policy's Option 2 (assuming the participant has elected this) under which the excess (if any) of the Policy's cash value over the "tabular cash value" (essentially the net level premium reserve on a regular whole life policy having the same face amount and the same net premium as the Policy) is added to the Policy's face amount, with the total becoming the death benefit payable under the Policy.

The Policy also permits the participant to direct that additional "unscheduled payments", over and above those called for by the regular level premium payment schedule, be made to the Policy as extra premiums which are allocated immediately and entirely to the cash value. Such additional payments can be made only by transfer from other accumulations to the credit of the participant under the Plan. To the extent that, as a result of such additional payments, the cash value is increased to a level that is in excess of the tabular cash value, there would (if Option 2 is in effect) be an additional death benefit—i.e., one in addition to the Policy's face amount—in the amount of such excess. Even if Option 2 is not in effect, the aforementioned increase in cash value could lead to a death benefit larger than the face amount, by reason of the "section 7702" provisions.

Finally, the Policy contains a "Special Premium Option" that comes into effect if and only if there to an excess of the (actual) cash value over the tabular cash value. When this excess is at least as great as the scheduled premium currently due, this option permits withdrawal from the cash value of an amount equal to that premium, so that by this means the premium is paid in full and the Policy remains in force.

LAW AND REGULATIONS

Section 401 (a) of the Code provides that, for a plan to be qualified, the contributions made by the employer must be f or the purpose of distributing to employees or their beneficiaries the corpus and income of the fund accumulated by the trust in accordance with the plan.

Section 1.401-1(b) (1) of the Income Tax Regulations states that a plan may provide for the payment of incidental death benefits through insurance or otherwise.

Revenue Ruling 54-51, 1954-1 C.B. 147, states that ordinary life insurance may be considered "incidental" where the aggregate premiums for such life insurance in the case of each participant are less than 50% of the aggregate of contributions allocated to such participant at any particular time.

ANALYSIS

The Policy is similar to a traditional ordinary whole life insurance policy insofar as it basically provides death benefit coverage for life in a stipulated level amount as long as scheduled level premiums are paid as they fall due.

It differs from a traditional ordinary whole life insurance policy essentially only in that it generally does not contain guaranteed (i.e., contractual) cash values and that it permits, in addition to the level premium payment schedule under the Policy, unscheduled extra premiums to be made to the Policy, where (if Option 2 is not in effect) such extra premiums do not directly affect the death benefit amount but rather are allocated directly to the cash value, which can affect the death benefit but not to a significant degree. If however option 2 is in effect, the potential for increase in, death benefit is significant and might well exceed what we would consider "incidental" in this context. Accordingly, this ruling letter does not address the situation in which the option 2 provisions are applicable. The balance of this letter is based on the assumption that such provisions are not in effect.

In general, an insurance policy may be deemed to be ordinary whole life insurance for the purpose of applying Revenue Ruling 54-51 if, by the terms of the policy, the following two conditions are met:

(1) the amount of the death benefit may not decrease, and (2) the contractual premium may not increase during the period which is the lesser of the lifetime of the participant or the time the policy remains in force.

The Policy deviates from (1) above only insofar as a decline in the cash value from (a) a level that would cause the "section 7702" provisions to be operative, to (b) a level where they would not. We deem the decrease in death benefit in these circumstances to be a de minimis situation that does not preclude compliance with the condition in (1).

As to condition (2) above, the unscheduled extra premiums that are permitted under the Policy are not contractual (in the sense of being required to assure payment of the full death benefit) and in any case do not affect the amount of death benefit payable, except of course to the extent that the cash value (which is affected by these extra premiums) reaches a level that brings the "section 7702" provisions into operation.

CONCLUSIONS

1. The Policy (in the absence of an election to have Option 2 made applicable) is an ordinary whole life insurance policy within the meaning of Revenue Ruling 54-51.

2. A defined contribution (individual account) plan which is in all other respects qualified under Code section 401(a) will not fail to qualify merely because a participant is permitted to direct that up to 50% of total contributions otherwise allocated in full to his/her account be used as premiums for a Policy on his/her life.

<<END RULING>>

What is claimed is:

1. A computer-implemented data-processing method for creating a qualified defined benefit pension plan funded using variable life insurance contracts, the method comprising:

(a) entering, via at least one user interface, actuarial data used to create the qualified defined benefit pension plan;

(b) based on the actuarial data, electronically generating a variable life insurance policy;

(c) funding the qualified defined benefit pension plan using the variable life insurance policy;

(d) electronically generating a separate agreement that extra-contractually modifies the variable life insurance policy, wherein the plan includes the policy and the separate agreement; and (e) providing a guaranty of the plan benefits using the plan's policy and separate agreement.

2. A computer-implemented data-processing method for creating a qualified defined benefit pension plan funded using variable annuity contracts, the method comprising:

(a) entering, via at least one user interface, actuarial data used to create the qualified defined benefit pension plan;

(b) based on the actuarial data, electronically generating a variable annuity policy;

(c) funding the qualified defined benefit pension plan using the variable annuity policy;

(d) electronically generating a separate agreement that extra-contractually modifies the variable annuity policy, wherein the plan includes the policy and the separate agreement; and (e) providing a guaranty of the plan benefits using the plan's policy and separate agreement.

3. A computer-implemented data-processing method for creating a qualified defined benefit pension plan funded using at least one of life insurance contracts and annuity contracts, the method comprising:

(a) entering, via at least one user interface, actuarial data used to create the qualified defined benefit pension plan;

(b) based on the actuarial data, electronically generating at least one policy selected from the group including a life insurance policy and an annuity policy;

(c) funding the qualified defined benefit pension plan using the selected at least one policy;

(d) electronically generating a separate agreement that extra-contractually modifies the selected at least one policy, wherein the plan includes the separate agreement and at least one of the policies; and (e) providing a guaranty of the plan benefits using the plan's separate agreement and at least one policy.

4. The method of claim 3, further comprising:

(f) determining a negotiated guaranteed rate of return for the defined benefit pension plan.

5. The method of claim 4, comprising:

(g) determining, after a predetermined period of time, whether earnings based on funds contributed to the defined benefit pension plan exceed the guaranteed rate of return, and if so, setting an "actual earnings" parameter to determine future contributions to the defined benefit pension plan.

6. The method of claim 3, wherein the life insurance policy is a variable life insurance policy and the annuity policy is a variable annuity policy.

7. The method of claim 3, further comprising:

(f) electronically generating a software illustration associated with the selected at least one policy based on information received from at least one remotely located processor that processed the actuarial data.

8. The method of claim 3, further comprising:

(f) allocating funds contributed to the defined benefit pension plan between a General Account and a Variable Account.

9. A system for creating a qualified defined benefit pension plan funded using variable life insurance contracts, the system comprising:

(a) at least one user interface for entering actuarial data used to create the defined benefit pension plan; and (b) at least one processor that receives the actuarial data from the user interface and, in response, electronically generates a qualified defined benefit pension plan that includes:

(i) a variable life insurance policy;
a source of funding for the qualified defined benefit pension plan using the variable life insurance policy;
(iii) a separate agreement that extra-contractually modifies the variable life insurance policy; and
(iv) a guaranty of the plan benefits using the plan's policy and separate agreement.

10. A system for creating a qualified defined benefit pension plan funded using variable annuity contracts, the system comprising:
(a) at least one user interface for entering actuarial data used to create the defined benefit pension plan; and
(b) at least one processor that receives the actuarial data from the user interface and, in response, electronically generates a qualified defined benefit pension plan that includes:
(i) a variable annuity policy;
(ii) a source of funding for the qualified defined benefit pension plan using the variable annuity policy;
(iii) a separate agreement that extra-contractually modifies the variable annuity policy; and
(iv) a guaranty of the plan benefits usina the plan's policy and separate agreement.

11. A system for creating a qualified defined benefit pension plan funded using at least one of life insurance contracts and annuity contracts, the system comprising:
(a) at least one user interface for entering actuarial data used to create the qualified defined benefit pension plan; and
(b) at least one processor that receives the actuarial data from the user interface and, in response, electronically generates a qualified defined benefit pension plan that includes:
(i) at least one policy, selected from the group including a life insurance policy and an annuity policy;
(ii) a source of funding for the qualified defined benefit pension plan using the selected at least one policy;
(iii) a separate agreement that extra-contractually modifies the selected at least one policy; and
(iv) a guaranty of the plan benefits using the plan's policy and separate agreement.

12. The system of claim 11, wherein a negotiated guaranteed rate of return is determined for the defined benefit pension plan by the processor.

13. The system of claim 12, wherein, after a predetermined period of time, the processor determines whether earnings based on funds contributed to the defined benefit pension plan exceed the guaranteed rate of return, and if so, an "actual earnings" parameter is set to determine future contributions to the defined benefit pension plan.

14. The system of claim 11, wherein the life insurance policy is a variable life insurance policy and the annuity policy is a variable annuity policy.

15. The system of claim 11, wherein the processor electronically generates a software illustration associated with the selected policy based on information received from at least one remotely located processor that processed the actuarial data.

16. The system of claim 11, wherein funds contributed to the defined benefit pension plan are allocated between a General Account and a Variable Account.

* * * * *